(12) United States Patent
Ackerman et al.

(10) Patent No.: US 6,986,931 B2
(45) Date of Patent: Jan. 17, 2006

(54) DISPOSABLE CUTTING SHEET

(75) Inventors: Bryan L. Ackerman, Freeland, MI (US); John S. Trent, Saginaw, MI (US); William E. LeBoeuf, Midland, MI (US); Virginia D. Karul, Racine, WI (US); Kent B. McReynolds, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 6 days.

(21) Appl. No.: 10/075,020

(22) Filed: Feb. 12, 2002

(65) Prior Publication Data

US 2002/0127369 A1    Sep. 12, 2002

Related U.S. Application Data

(63) Continuation-in-part of application No. 09/677,663, filed on Oct. 2, 2000.

(51) Int. Cl.
*B32B 3/10*      (2006.01)
(52) U.S. Cl. ................ 428/137; 428/78; 428/131; 428/138; 428/192; 428/911; 269/289 R
(58) Field of Classification Search ................. 428/77, 428/78, 131, 137, 138, 141, 192, 193, 194, 428/911; 269/289 R; 604/358, 367, 374
See application file for complete search history.

(56) References Cited

U.S. PATENT DOCUMENTS

| | | | |
|---|---|---|---|
| 1,481,971 A | 1/1924 | Whiting | 95/91 |
| 1,814,485 A | 7/1931 | Moss | 426/283 |
| 2,001,389 A | 5/1935 | Kratz | 18/57 |
| 2,226,186 A | 12/1940 | Derhoef | 18/15 |
| 2,593,592 A | 4/1952 | Miller | 99/446 |
| 2,757,478 A | 8/1956 | Borland | 248/346.11 |
| 2,778,324 A | 1/1957 | Mattison | 107/46 |
| 2,819,981 A | 1/1958 | Schornstheimer et al. | 117/11 |
| 2,935,107 A | 5/1960 | Bertelsen et al. | 146/215 |
| 2,936,814 A | 5/1960 | Yakubik | 264/271.1 |
| 2,962,414 A | 11/1960 | Arledter | 162/145 |
| 2,962,415 A | 11/1960 | Arledter | 162/145 |
| 2,984,869 A | 5/1961 | O'Conor et al. | 18/48 |
| 3,026,209 A | 3/1962 | Niblack et al. | 426/124 |
| 3,030,251 A | 4/1962 | La Bore et al. | 428/40.1 |

(Continued)

FOREIGN PATENT DOCUMENTS

DE    1 972 165    11/1967

(Continued)

OTHER PUBLICATIONS

Photograph and English translation of Product Package of Kobayashi Pharmaccutical Co., Ltd., For "Slime and Odor Free Cutting Board Sheet," Jan. 17, 2001.

(Continued)

*Primary Examiner*—Alicia Chevalier

(57) ABSTRACT

A disposable cutting sheet for cutting and preparation of food items thereon comprises a first cut-resistant layer having a first surface area and including a cellulosic ply and a thermoplastic material ply, wherein the thermoplastic material ply of the first layer includes a plurality of apertures therethrough. The cutting sheet further includes a second layer having a second surface area and including a cellulosic ply and a thermoplastic material ply. The cellulosic ply of the first layer is disposed on and secured to the cellulosic ply of the second layer such that portions of the thermoplastic and cellulosic plies of the second layer extend beyond the surface area of the first layer to form a border completely surrounding the first layer.

73 Claims, 7 Drawing Sheets

U.S. PATENT DOCUMENTS

| | | | | |
|---|---|---|---|---|
| 3,040,949 A | 6/1962 | Foote | 229/407 |
| 3,060,515 A | 10/1962 | Corbett | 18/48 |
| 3,184,373 A | 5/1965 | Arledter | 162/152 |
| 3,209,978 A | 10/1965 | Dupuis | 206/205 |
| 3,223,567 A | 12/1965 | Trewella | 156/253 |
| 3,325,345 A | 6/1967 | Hider | 162/169 |
| 3,376,238 A | 4/1968 | Gregorian et al. | 260/2.5 |
| 3,448,913 A | 6/1969 | Wolff | 229/14 |
| 3,484,835 A | 12/1969 | Trounstine et al. | 161/130 |
| 3,515,331 A | 6/1970 | Guthrie, Sr. | 229/14 |
| 3,517,407 A | 6/1970 | Wyant | 15/215 |
| 3,575,764 A | 4/1971 | McFarren | 156/309 |
| 3,628,720 A | 12/1971 | Schmedding | 229/55 |
| 3,640,829 A | 2/1972 | Elton | 161/159 |
| 3,649,426 A | 3/1972 | Gates, Jr. | 161/43 |
| 3,678,933 A | 7/1972 | Moore et al. | 128/296 |
| 3,684,641 A | 8/1972 | Murphy | 161/129 |
| 3,685,643 A | 8/1972 | Garshelis | 206/57 |
| 3,698,933 A | 10/1972 | Lceks et al. | 117/72 |
| 3,710,797 A | 1/1973 | Marsan | 128/284 |
| 3,724,464 A | 4/1973 | Enloe | 128/284 |
| 3,835,756 A | 9/1974 | Bosse | |
| 3,837,634 A | 9/1974 | Cobb | 269/289 |
| 3,848,595 A | 11/1974 | Endress | 128/284 |
| 3,856,610 A | 12/1974 | Bruneel | 161/43 |
| 3,870,593 A | 3/1975 | Elton et al. | 161/159 |
| 3,888,248 A | 6/1975 | Moore et al. | 128/156 |
| 3,929,135 A | 12/1975 | Thompson | 128/287 |
| 3,937,648 A | 2/1976 | Huebner et al. | 162/168 R |
| 3,945,386 A | 3/1976 | Anczurowski et al. | 128/287 |
| 3,950,578 A | 4/1976 | Laumann | 427/378 |
| 3,967,623 A | 7/1976 | Butterworth et al. | 128/287 |
| 3,993,718 A | 11/1976 | Bontinck et al. | 264/22 |
| 4,035,543 A | 7/1977 | Draper et al. | 428/245 |
| 4,064,300 A | 12/1977 | Bhangu | 428/120 |
| 4,096,309 A | 6/1978 | Stillman | 428/285 |
| 4,116,426 A | 9/1978 | Kessler | 269/307 |
| 4,123,417 A | 10/1978 | Finberg | 260/42.46 |
| 4,128,686 A | 12/1978 | Kyle et al. | 428/219 |
| 4,192,494 A | 3/1980 | Mima | 269/289 R |
| 4,225,383 A | 9/1980 | McReynolds | 162/156 |
| 4,243,619 A | 1/1981 | Fraser et al. | 264/40.6 |
| 4,246,305 A | 1/1981 | Delattre | 428/36 |
| 4,252,516 A | 2/1981 | Raley et al. | 425/290 |
| 4,275,811 A | 6/1981 | Miller | 206/204 |
| 4,276,338 A | 6/1981 | Ludwa et al. | 428/137 |
| 4,311,479 A | 1/1982 | Fenn et al. | 8/495 |
| 4,316,070 A | 2/1982 | Prosise et al. | 219/10.55 E |
| 4,328,275 A | 5/1982 | Vargo | 428/156 |
| 4,338,366 A | 7/1982 | Evans et al. | 428/76 |
| 4,359,553 A | 11/1982 | Edwards | 525/240 |
| 4,364,723 A | 12/1982 | Louis et al. | 425/384 |
| 4,364,787 A | 12/1982 | Radzins | 156/164 |
| 4,378,404 A | 3/1983 | Liu | 428/290 |
| 4,378,451 A | 3/1983 | Edwards | 525/240 |
| 4,379,192 A | 4/1983 | Wahlquist et al. | 428/156 |
| 4,379,808 A | 4/1983 | Cole et al. | 428/438 |
| 4,382,507 A | 5/1983 | Miller | 206/204 |
| 4,410,578 A | 10/1983 | Miller | 428/117 |
| 4,412,036 A | 10/1983 | Pedersen et al. | 525/54.26 |
| 4,414,255 A | 11/1983 | Tokuyama et al. | 428/154 |
| 4,430,284 A | 2/1984 | Rasmussen | 264/171 |
| 4,438,167 A | 3/1984 | Schwarz | 428/138 |
| 4,440,385 A | 4/1984 | Kingery | 269/13 |
| 4,450,195 A | 5/1984 | Hagbjer | 428/178 |
| 4,467,012 A | 8/1984 | Pedersen et al. | 428/248 |
| 4,487,796 A | 12/1984 | Lloyd et al. | 428/154 |
| 4,507,351 A | 3/1985 | Johnson et al. | 428/198 |
| 4,518,643 A | 5/1985 | Francis | 428/131 |
| 4,528,312 A | 7/1985 | Edwards | 524/232 |
| 4,587,152 A | 5/1986 | Gleichenhagen et al. | 428/195 |
| 4,589,940 A | 5/1986 | Johnson | 156/78 |
| 4,608,115 A | 8/1986 | Schroth et al. | 156/519 |
| 4,610,751 A | 9/1986 | Eschler | 156/517 |
| 4,614,679 A | 9/1986 | Farrington, Jr. et al. | 428/138 |
| 4,636,424 A | 1/1987 | Amemiya et al. | 428/198 |
| 4,643,727 A | 2/1987 | Rosenbaum | 604/369 |
| 4,653,737 A | 3/1987 | Haskins et al. | 269/13 |
| 4,657,133 A * | 4/1987 | Komatsu et al. | 206/204 |
| 4,667,665 A | 5/1987 | Blanco et al. | 128/156 |
| 4,723,953 A | 2/1988 | Rosenbaum et al. | 604/369 |
| 4,726,876 A | 2/1988 | Tomsovic, Jr. | 156/552 |
| 4,726,977 A | 2/1988 | Goldstein et al. | 428/138 |
| 4,735,846 A | 4/1988 | Larsonneur | 428/198 |
| 4,737,402 A | 4/1988 | Harpell et al. | 428/252 |
| 4,756,939 A | 7/1988 | Goodwin | 428/74 |
| 4,769,109 A | 9/1988 | Tellvik et al. | 162/123 |
| 4,769,274 A | 9/1988 | Tellvik et al. | 428/218 |
| 4,770,920 A | 9/1988 | Larsonneur | 428/198 |
| 4,786,346 A | 11/1988 | Ales et al. | 156/160 |
| 4,787,597 A | 11/1988 | Yokota et al. | 249/113 |
| 4,808,675 A | 2/1989 | Twilley et al. | 525/408 |
| 4,838,253 A | 6/1989 | Brassington et al. | 128/156 |
| 4,847,142 A | 7/1989 | Twilley et al. | 428/252 |
| 4,859,259 A | 8/1989 | Scheibner | 156/66 |
| 4,861,632 A | 8/1989 | Caggiano | 428/35.2 |
| 4,865,855 A | 9/1989 | Hansen et al. | 426/124 |
| 4,878,765 A | 11/1989 | Watkins et al. | 383/116 |
| 4,892,782 A | 1/1990 | Fisher et al. | 428/240 |
| 4,898,761 A | 2/1990 | Dunaway et al. | 428/137 |
| 4,921,702 A | 5/1990 | Banks et al. | 424/404 |
| 4,929,480 A | 5/1990 | Midkiff et al. | 428/35.6 |
| 4,935,276 A | 6/1990 | Pawlowski et al. | 428/35.7 |
| 4,935,282 A * | 6/1990 | Pawlowski et al. | 428/121 |
| 4,946,539 A | 8/1990 | Ales et al. | 156/495 |
| 4,948,653 A | 8/1990 | Dinter et al. | 428/172 |
| 4,950,524 A | 8/1990 | Hacker | 428/163 |
| 4,950,526 A | 8/1990 | Singleton | 428/166 |
| 4,957,805 A | 9/1990 | Biggs et al. | 428/223 |
| 4,961,930 A | 10/1990 | Perdelwitz, Jr. et al. | 424/411 |
| 4,977,031 A | 12/1990 | Temple | 428/463 |
| 4,984,907 A | 1/1991 | Power | 383/109 |
| 4,988,471 A | 1/1991 | Millevoi et al. | 264/211.12 |
| 5,000,341 A | 3/1991 | Shirota | 220/452 |
| 5,028,332 A | 7/1991 | Ohnishi | 210/500.34 |
| 5,041,325 A | 8/1991 | Larson et al. | 428/156 |
| 5,055,332 A | 10/1991 | Rhodes et al. | 428/74 |
| 5,082,721 A | 1/1992 | Smith, Jr. et al. | 428/252 |
| 5,085,416 A | 2/1992 | Miyake et al. | 269/289 |
| 5,093,164 A | 3/1992 | Bauer et al. | 428/35.4 |
| 5,096,722 A | 3/1992 | Bair | 426/107 |
| 5,102,485 A | 4/1992 | Keeler et al. | 156/256 |
| 5,106,696 A | 4/1992 | Chundury et al. | 428/517 |
| 5,116,661 A | 5/1992 | Matsubara | 428/198 |
| 5,119,512 A | 6/1992 | Dunbar et al. | 2/167 |
| 5,124,519 A | 6/1992 | Roy et al. | 219/10.55 E |
| 5,141,794 A | 8/1992 | Arroyo | 428/138 |
| 5,151,314 A * | 9/1992 | Brown | 428/198 |
| 5,154,960 A | 10/1992 | Mucci et al. | 428/68 |
| 5,162,148 A | 11/1992 | Boye et al. | 428/287 |
| 5,176,930 A | 1/1993 | Kannankeril et al. | 426/124 |
| 5,200,263 A | 4/1993 | Gould et al. | 428/323 |
| 5,203,548 A | 4/1993 | Sanders | 269/302.1 |
| D336,580 S | 6/1993 | White et al. | D6/518 |
| 5,215,627 A | 6/1993 | Willis et al. | 162/156 |
| 5,241,149 A | 8/1993 | Watanabe et al. | 219/10.55 E |
| 5,261,899 A | 11/1993 | Visscher et al. | 604/367 |
| 5,270,089 A | 12/1993 | Alston et al. | 428/60 |
| 5,301,806 A | 4/1994 | Olson | 206/278 |
| 5,310,587 A | 5/1994 | Akahori et al. | 428/35.2 |
| 5,320,895 A | 6/1994 | Larsonneur et al. | 428/137 |
| 5,328,450 A | 7/1994 | Smith et al. | 602/59 |
| 5,338,406 A | 8/1994 | Smith | 162/168.2 |
| 5,368,909 A | 11/1994 | Langdon et al. | 428/137 |

| | | | | | | | |
|---|---|---|---|---|---|---|---|
| 5,368,927 A | | 11/1994 | Lesca et al. .................. 428/288 | 6,042,844 A | | 3/2000 | Ishida et al. ................. 424/443 |
| 5,376,392 A | | 12/1994 | Ikegami et al. .............. 426/127 | 6,050,517 A | | 4/2000 | Dobrescu et al. ......... 242/417.2 |
| 5,386,978 A | | 2/1995 | Ladwig ...................... 269/289 R | RE36,717 E | | 5/2000 | Thompson .................. 426/518 |
| 5,407,612 A | | 4/1995 | Gould et al. ................... 264/24 | 6,066,375 A | | 5/2000 | Shanton ..................... 428/35.7 |
| 5,414,248 A | * | 5/1995 | Phillips ....................... 219/730 | 6,079,555 A | | 6/2000 | Posson ....................... 206/204 |
| 5,433,424 A | | 7/1995 | Watanabe ............... 269/289 R | 6,080,474 A | | 6/2000 | Oakley et al. .............. 428/323 |
| 5,460,884 A | | 10/1995 | Kobylivker et al. ......... 428/373 | 6,103,141 A | * | 8/2000 | Incorvia et al. ............. 252/194 |
| 5,472,790 A | | 12/1995 | Thompson ................... 428/500 | 6,114,456 A | | 9/2000 | Dewart et al. .............. 525/240 |
| 5,480,693 A | | 1/1996 | Patterson et al. ........... 428/36.7 | 6,152,025 A | | 11/2000 | Oien et al. ..................... 99/495 |
| 5,485,937 A | | 1/1996 | Tseng ......................... 220/571 | 6,158,579 A | | 12/2000 | Rosenbaum .............. 206/45.29 |
| 5,500,270 A | | 3/1996 | Langdon et al. ............ 428/119 | 6,164,478 A | | 12/2000 | Cant ......................... 220/62.1 |
| 5,501,886 A | | 3/1996 | Hammer et al. ............ 428/34.8 | 6,171,695 B1 | | 1/2001 | Fontenot et al. ............ 428/337 |
| 5,520,945 A | | 5/1996 | Coggins ...................... 426/496 | 6,180,037 B1 | | 1/2001 | Andersen et al. ........... 264/108 |
| 5,536,555 A | | 7/1996 | Zelazoski et al. ........... 428/138 | 6,180,584 B1 | | 1/2001 | Sawan et al. ............... 510/382 |
| 5,556,504 A | | 9/1996 | Rajala et al. ................ 156/519 | 6,206,445 B1 | | 3/2001 | Brooks ........................ 296/51 |
| 5,562,872 A | | 10/1996 | Watanabe ................... 264/145 | 6,221,382 B1 | | 4/2001 | Ishida et al. ................. 424/443 |
| 5,565,258 A | | 10/1996 | McConnell et al. ......... 428/122 | 6,227,541 B1 | | 5/2001 | Couillard et al. ............ 271/307 |
| 5,568,657 A | | 10/1996 | Cordova et al. ............... 2/167 | 6,228,062 B1 | | 5/2001 | Howell et al. ............... 604/171 |
| 5,580,423 A | | 12/1996 | Ampulski et al. ........ 162/111.7 | 6,238,767 B1 | | 5/2001 | McCormack et al. ......... 428/99 |
| 5,585,420 A | | 12/1996 | Grasmeder et al. ......... 523/400 | 6,268,438 B1 | | 7/2001 | Ellul et al. .................. 525/240 |
| 5,591,227 A | | 1/1997 | Dinh et al. ..................... 623/1 | 6,270,878 B1 | | 8/2001 | Wegele et al. .............. 428/195 |
| 5,592,690 A | | 1/1997 | Wu ................................ 2/67 | 6,271,155 B1 | | 8/2001 | Noma et al. ................ 442/398 |
| 5,605,739 A | | 2/1997 | Stokes et al. ................ 428/198 | 6,274,232 B1 | | 8/2001 | Otten et al. ............... 428/315.9 |
| 5,607,745 A | | 3/1997 | Ogden ......................... 428/138 | 6,328,722 B1 | | 12/2001 | Lavash et al. .......... 604/385.04 |
| 5,607,798 A | | 3/1997 | Kobylivker et al. ......... 443/381 | 6,329,565 B1 | | 12/2001 | Dutkiewicz et al. ......... 604/378 |
| 5,613,427 A | | 3/1997 | Wiley ........................... 99/446 | 6,346,575 B1 | | 2/2002 | Debras et al. ............... 525/191 |
| 5,614,283 A | | 3/1997 | Potnis et al. ................. 428/131 | 6,383,614 B1 | | 5/2002 | Carson et al. ............... 428/206 |
| 5,645,933 A | | 7/1997 | Sakazume et al. ........... 442/290 | 6,383,615 B2 | | 5/2002 | Otten et al. .................. 428/206 |
| 5,652,041 A | | 7/1997 | Buerger et al. .............. 428/198 | 6,391,467 B1 | | 5/2002 | DeLisio et al. .............. 428/516 |
| 5,652,051 A | | 7/1997 | Shawver et al. ............. 442/362 | 6,391,806 B1 | | 5/2002 | Carson et al. ............... 442/327 |
| 5,662,758 A | | 9/1997 | Hamilton et al. ............ 156/221 | 6,422,551 B1 | | 7/2002 | Brotz ...................... 269/289 R |
| 5,662,978 A | | 9/1997 | Brown et al. .................. 428/57 | 6,433,095 B1 | | 8/2002 | Laurent ....................... 525/240 |
| 5,674,342 A | | 10/1997 | Obijeski et al. ........ 156/244.11 | 6,436,218 B2 | | 8/2002 | Sher et al. ................... 156/209 |
| 5,695,376 A | | 12/1997 | Datta et al. .................. 442/334 | 6,468,646 B2 | | 10/2002 | Carson et al. ............. 428/315.9 |
| 5,698,290 A | | 12/1997 | Fukushima et al. ......... 428/138 | D475,206 S | | 6/2003 | Ackerman et al. ............. D5/57 |
| 5,709,897 A | * | 1/1998 | Pearlstein .................... 426/106 | D475,856 S | | 6/2003 | Karul et al. .................... D5/53 |
| 5,714,229 A | | 2/1998 | Ogden ......................... 428/138 | 6,579,816 B2 | | 6/2003 | Lockett ....................... 442/417 |
| 5,716,478 A | | 2/1998 | Boothe et al. ............... 156/302 | 6,592,983 B1 | | 7/2003 | Carson et al. ............... 428/323 |
| 5,718,955 A | | 2/1998 | McGuire et al. ............ 428/35.7 | 6,617,004 B2 | | 9/2003 | Lake et al. ................... 428/138 |
| 5,733,822 A | | 3/1998 | Gessner et al. ................ 442/35 | 2002/0082540 A1 | | 6/2002 | Johnson et al. |
| 5,744,406 A | | 4/1998 | Novak ......................... 442/121 | 2003/0065194 A1 | | 4/2003 | Lake et al. |
| RE35,814 E | | 6/1998 | Olson ......................... 206/278 | | | | |
| 5,759,340 A | | 6/1998 | Boothe et al. ............... 156/519 | | | FOREIGN PATENT DOCUMENTS | |
| 5,763,337 A | | 6/1998 | Montgomery ............... 442/398 | | | | |
| H1738 H | | 7/1998 | Reinhart, Jr. ................. 2/49.1 | DE | | 91 06 447 | 9/1991 |
| 5,776,295 A | | 7/1998 | Montgomery ............... 156/324 | DE | | 40 39 354 | 6/1992 |
| 5,776,619 A | | 7/1998 | Shanton ...................... 428/511 | DE | | 43 24 802 | 1/1995 |
| 5,786,064 A | | 7/1998 | Finestone et al. ........... 428/137 | DE | | 196 34 196 | 2/1998 |
| 5,802,610 A | | 9/1998 | Burr .............................. 2/49.4 | EP | | 0 295 943 | 12/1988 |
| 5,804,241 A | | 9/1998 | Isohata ....................... 426/415 | EP | | 0 497 608 | 8/1992 |
| 5,833,894 A | | 11/1998 | Lanzani et al. ............. 264/46.3 | EP | | 0 528 248 | 2/1993 |
| 5,834,104 A | | 11/1998 | Cordani ...................... 428/218 | EP | | 0 537 130 | 4/1993 ................. 4/602 |
| 5,865,822 A | | 2/1999 | Hamajima et al. .......... 605/367 | EP | | 0 332 739 | 1/1994 |
| 5,871,607 A | | 2/1999 | Hamilton et al. ............ 156/221 | EP | | 0 673 856 | 9/1995 |
| 5,882,464 A | | 3/1999 | Theisgen et al. ............ 156/269 | EP | | 0 613 834 | 6/1997 |
| 5,888,604 A | | 3/1999 | Evans, Jr. et al. ............ 428/47 | EP | | 0 816 060 | 1/1998 |
| 5,899,444 A | | 5/1999 | Rempe .......................... 269/3 | EP | | 0 905 173 | 3/1999 ................. 5/18 |
| 5,900,306 A | | 5/1999 | Stopper ...................... 428/198 | EP | | 1 035 244 | 9/2000 |
| 5,925,406 A | | 7/1999 | McGuire et al. ......... 427/208.2 | GB | | 1 168 925 | 10/1969 |
| 5,938,185 A | | 8/1999 | Kletter .................... 269/289 R | GB | | 1 390 240 | 4/1975 |
| 5,941,863 A | | 8/1999 | Guidotti et al. ............. 604/378 | GB | | 2 284 047 | 5/1995 |
| 5,948,707 A | | 9/1999 | Crawley et al. ............. 442/101 | JP | | 54-63972 | 5/1979 |
| 5,948,711 A | | 9/1999 | Closson ...................... 442/398 | JP | | 64-43506 | 2/1989 |
| 5,965,235 A | | 10/1999 | McGuire et al. ............ 428/156 | JP | | 030 382 49 | 1/1991 |
| 5,968,633 A | | 10/1999 | Hamilton et al. ............ 428/174 | JP | | 4 135 321 | 12/1992 |
| 5,984,294 A | | 11/1999 | Bogomolny ............ 269/289 R | JP | | 5178377 | 7/1993 |
| 5,997,989 A | | 12/1999 | Gessner et al. .............. 428/152 | JP | | 52-77037 | 10/1993 |
| 5,998,039 A | * | 12/1999 | Tanizaki et al. ............. 428/516 | JP | | 5305978 | 11/1993 |
| 6,005,053 A | | 12/1999 | Parikh et al. ................ 525/221 | JP | | 60-57610 | 3/1994 |
| 6,021,524 A | | 2/2000 | Wu et al. ....................... 2/167 | JP | | 62-37870 | 8/1994 |
| 6,022,443 A | | 2/2000 | Rajala et al. ................ 156/302 | JP | | 70-51169 | 2/1995 |
| 6,037,022 A | | 3/2000 | Adur et al. ................. 128/34.3 | JP | | 7 235 42 | 5/1995 |
| 6,037,281 A | | 3/2000 | Mathis et al. ............... 442/394 | JP | | 072 518 76 | 10/1995 |

| | | |
|---|---|---|
| JP | 080 528 41 | 2/1996 |
| JP | 082 057 62 | 8/1996 |
| JP | 83-32154 | 12/1996 |
| JP | 90-10122 | 1/1997 |
| JP | 90-23989 | 1/1997 |
| JP | 92-15613 | 8/1997 |
| JP | 10 33396 | 2/1998 |
| JP | 100-33396 | 2/1998 |
| JP | 100-71094 | 3/1998 |
| JP | 101 297 39 | 5/1998 |
| JP | 10137140 | 5/1998 |
| JP | 101 510 75 | 6/1998 |
| JP | 101-65319 | 6/1998 |
| JP | 101-85226 | 7/1998 |
| JP | 102-16032 | 8/1998 |
| JP | 102-76918 | 10/1998 |
| JP | 10313776 | 12/1998 |
| JP | 11 18971 | 1/1999 |
| JP | 110-18970 | 1/1999 |
| JP | 112-08734 | 8/1999 |
| JP | 2000-041869 | 2/2000 |
| WO | WO 91/00835 | 1/1991 |
| WO | WO 94/22393 | 10/1994 |
| WO | WO 96/13979 | 5/1996 |
| WO | WO 96/14038 | 5/1996 |
| WO | WO 97/10161 | 3/1997 |
| WO | WO 97/30909 | 8/1997 |
| WO | WO 97/49955 | 12/1997 |
| WO | WO 98/51251 | 11/1998 |
| WO | WO 99/10164 | 3/1999 |
| WO | WO 99/37969 | 7/1999 |
| WO | WO 00/05065 | 2/2000 |
| WO | WO 00/29209 | 5/2000 |
| WO | WO 00/29311 | 5/2000 |
| WO | WO 00/78535 | 12/2000 |
| WO | WO 00/78536 | 12/2000 |
| WO | WO 00/78537 | 12/2000 |
| WO | WO 00/78848 | 12/2000 |
| WO | WO 01/26524 | 4/2001 |
| WO | WO 01/29301 | 4/2001 |
| WO | WO 03/006155 | 1/2003 |

OTHER PUBLICATIONS

Website download from www.demarleusa.com for "Silpat," a non-stick silicone backing sheet: DeMarle, Inc., USA, 1982.

Website download from www.cutandtoss.com for "Cut & Toss Disposable Cutting Board," Jun. 2000.

Competitive Information Study for "UniCharm" multipurpose sheets; UniCharm, Japan, Jun. 28, 2000.

Dental Bib advertisement, Grahm Dental Products, www.grahamdental.com, May 2001.

International Preliminary Examination Report dated Oct. 1, 2002 Appl. No. PCT/US01/30206.

Dow Corning's Q2-5211 Superwetting Agent Supplier Brochure, (1993) (2 pages).

"Hydrophillic Concentrate-VW 351" Polyvel Supplier Brochure Hammonton, NJ, (1999) (2 pages).

Kulshreshtha et al., "Competitive New Technologies in Polyolefin Synthesis and Materials" *Handbook of Polyolefins,* $2^{nd}$ *Ed., Revised & Expanded* (2000) (pp. 1-69).

Imuta et al., "Recent Progress on SIngle-Site Catalysts" *Handbook of Polyolefins,* $2^{nd}$ *Ed., Revised & Expanded* (2000) (pp. 71-88).

Web pages "Surface Energy (Surface Wetting Capability", NDT Resource Center, (3 Pages).

* cited by examiner

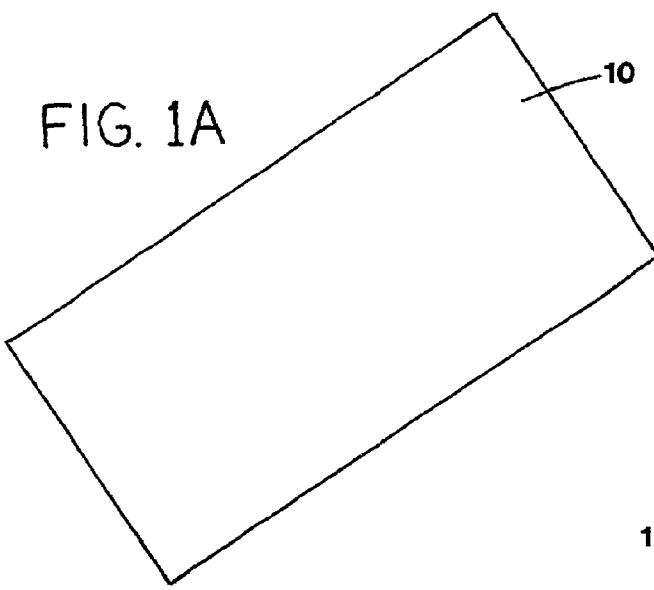
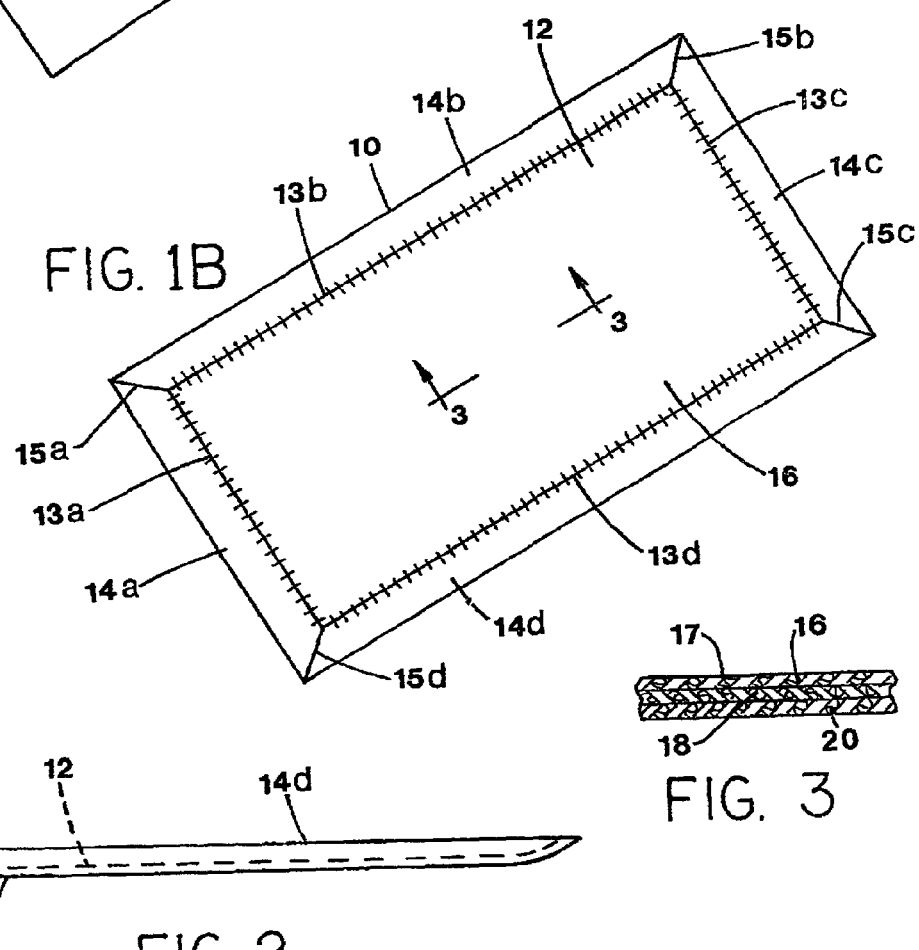
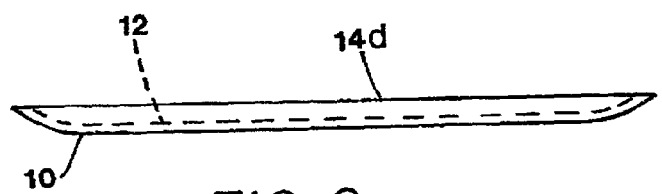

DISPOSABLE CUTTING SHEET

RELATED CASES

This application is a continuation-in-part of Ser. No. 09/677,663, filed Oct. 2, 2000, entitled "Processing Substrate and/or Support Surface."

TECHNICAL FIELD

The present invention relates generally to protective media, and, more particularly, to a cutting sheet which is disposable.

BACKGROUND ART

Management of bacteria, liquids, fats and other waste during the preparation and handling of foods is of concern in food handling areas. Typically, such areas include the kitchen, although modern lifestyles include out-of-home occasions such as social and recreational gatherings where food is prepared, transported and/or served outside of the kitchen. Foods of particular concern from the standpoint of possibility of food-borne illness are fish, fowl and ground meats; although all foods present some degree of risk. Current media articles discuss the fact that the common cutting boards used in the preparation of foods are a source of food contamination. Other commonly used food preparation surfaces, such as countertops, also present some risk. Specifically, it has been found that bacteria can become entrapped in surface imperfections of the cutting surface, resulting in a surface that is difficult, if not impossible, to clean and/or sterilize. The cutting surface thus becomes capable of transferring bacteria to other foods, which provides a favorable media for pathogens to proliferate, resulting in an increased potential for food-borne illness, particularly when contact is had with high-risk foods. In fact, some foods considered to be pathogenically low-risk, such as fresh fruits and vegetables can become contaminated, waiting for the right environment for the bacteria to proliferate. Illnesses from mild to severe or even fatal can result.

Another issue with cutting boards is the transfer of juices from the cutting board to other surfaces in the kitchen due to the fact that the cutting board is normally not designed to capture and contain juices during the cutting operation and thereafter through final disposal. In addition to the inconvenience of having to clean the countertop or other surface(s) exposed to the juices, a possibility exists that other food items placed on such surface(s) may be cross-contaminated.

Products are in the marketplace today that attempt to address issues of liquid, fat, and bacteria management during cutting and general food preparation. However, these products fall short of optimum in one way or another. Specifically, they do not absorb, are not cut resistant, and/or fail to provide an effective bacteria barrier between the food being handled and the work surface. Also, bacteria are retained which can cause contamination during subsequent use.

In addition to the foregoing, most, if not all, food preparation surfaces lack one or more of the following attributes:
1. a single use, disposable cutting surface that is virtually cut resistant and also entraps and holds waste and bacteria;
2. a food preparation surface which prevents food movement during cutting;
3. a food preparation surface which prevents and/or selectively manages movement thereof on the counter top during cutting;
4. a single-use food preparation surface which is easily disposed of while securely containing contaminants; and
5. a single-use cutting surface that lays flat during use.

Coggins U.S. Pat. No. 5,520,945 discloses a disposable sheet that may be used in food service applications to prevent the cross-contamination of foods and eliminate the need for time-consuming clean-ups. The sheet comprises a porous layer that allows materials such as oil or flour to pass through, an absorbent layer that holds the materials passing through the porous layer, and a barrier layer that ensures that the materials do not contaminate a food preparation surface. The sheet has multiple uses such as for rolling dough, absorbing excess moisture, making sandwiches, cutting breads and condiments, and drawing excess oil away from fried items. The disposable sheet is only disclosed for use with items that do not require aggressive cutting, and hence, is not adapted for use with items that require substantial cutting pressures, such as meats and hard vegetables.

Thompson U.S. Pat. No. Re. 36,717 discloses a flexible preparation and transfer sheet. The sheet comprises a homogeneous structure of polypropylene, with a thickness in a range between 0.010 to 0.030 inch. The sheet may be flexed about a longitudinal centerline whereupon the sheet material develops a cantilever beam strength sufficient to transport food articles after preparation to an appropriate container.

Wu et al. U.S. Pat. No. 6,021,524 discloses a polymeric film having increased cut resistance. The film comprises a polymeric matrix having a plurality of cut resistance fibers dispersed therein. The film is preferably made into medical or industrial gloves.

Otten et al. U.S. Pat. No. 6,274,232 discloses an absorbent and cut-resistant sheet having a cut-resistant material with a plurality of openings, and an absorbent material attached to the cut-resistant material. A liquid impervious backing layer is preferably attached to the absorbent material to resist the escape of fluid from the absorbent material.

PCT published application number WO 00/29209 discloses a flexible mat for absorbing liquids on floors or other surfaces. The mat includes a waterproof backing layer and a foam sheet formed by polymerization of a water-in-oil emulsion. The mat can optionally include a liquid pervious sheet and a non-skid material.

SUMMARY OF THE INVENTION

In accordance with one aspect of the present invention, a disposable cutting sheet for cutting and preparation of food items thereon includes a first cut-resistant layer having a first surface area and including a cellulosic ply and a thermoplastic material ply, wherein the thermoplastic material ply of the first layer includes a plurality of apertures therethrough. The cutting sheet further includes a second layer having a second surface area and including a cellulosic ply and a thermoplastic material ply. The cellulosic ply of the first layer is disposed on and secured to the cellulosic ply of the second layer such that portions of the thermoplastic and cellulosic plies of the second layer extend beyond the surface area of the first layer to form a border completely surrounding the first layer.

According to a further aspect of the present invention, a processing substrate comprises first means for providing a liquid-permeable, cut resistant surface capable of withstanding cutting by a serrated knife without substantial compromise of the processing substrate, second means disposed adjacent the first providing means for providing a liquid-absorbent portion and third means disposed adjacent the second providing means for providing a liquid-impermeable portion.

According to a further alternative aspect of the present invention, a method of forming a cutting surface comprising the steps of providing a first material having a liquid-permeable, cut-resistant surface that can withstand cutting by a serrated knife without substantial compromise of the first material, providing a second material disposed adjacent the first material and having a liquid-absorbent portion and providing a third material disposed adjacent the second material and having a liquid-impermeable surface.

In accordance with yet another aspect of the present invention, a method of processing an item comprises the steps of providing a processing surface comprising a first material having a liquid-permeable, cut-resistant surface that can withstand cutting by a serrated knife without substantial compromise of the first material, a second material disposed adjacent the first material and having a liquid-absorbent portion and a third material disposed adjacent the second material and having a liquid-impermeable surface, placing the item on the processing surface and processing the item while the item is on the processing surface. The item is then removed from the processing surface and the processing surface is disposed of.

In accordance with a further alternative aspect of the present invention, a disposable cutting sheet for cutting and preparation of food items thereon comprises a first cut-resistant layer having a first surface area and comprising a ply of tissue disposed below a ply of thermoplastic material wherein the first layer includes a plurality of apertures therethrough. The cutting sheet further includes a planner second layer having a second surface area and comprising a ply of tissue disposed above a ply of thermoplastic material. The tissue ply of the first layer is disposed on and secured to the tissue ply of the second layer and substantially centered on the second layer in at least one dimension such that portions of the thermoplastic and tissue plies of the second layer extend beyond the first surface area of the first layer to form a border completely surrounding the first layer.

Other aspects and advantages of the present invention will become apparent upon consideration of the following detailed description.

BRIEF DESCRIPTION OF THE DRAWINGS

FIG. 1A comprises an isometric view of a processing substrate according to a one embodiment the present invention;

FIG. 1B comprises an isometric view of a processing substrate according to another embodiment of the present invention;

FIG. 2 comprises a side elevational view of the processing substrate of FIG. 1; and FIG. 3 comprises a sectional view taken generally along the lines 3—3 of FIG. 1.

DESCRIPTION OF THE PREFERRED EMBODIMENTS

Figure 4:
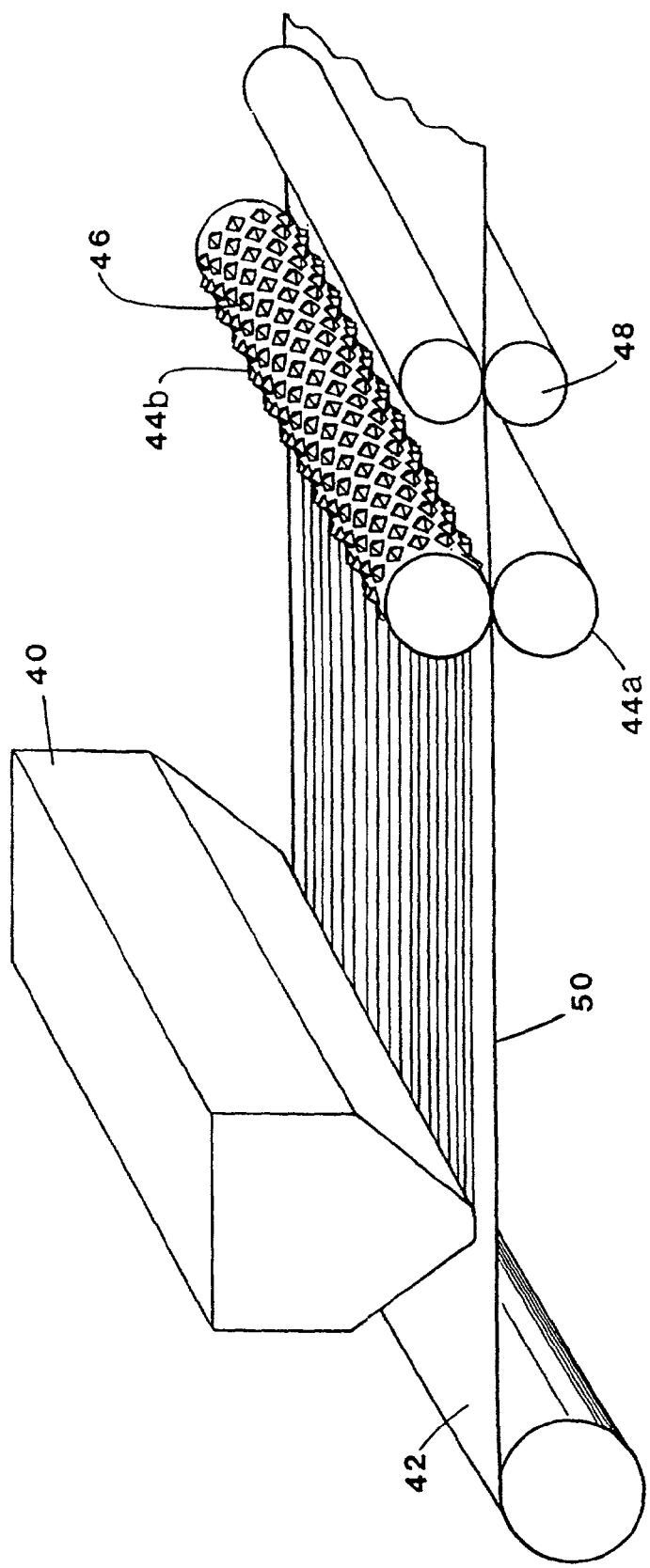
FIG. 4 comprises a perspective view of apparatus for producing processing substrates as shown in FIGS. 1A.
Figure 5:
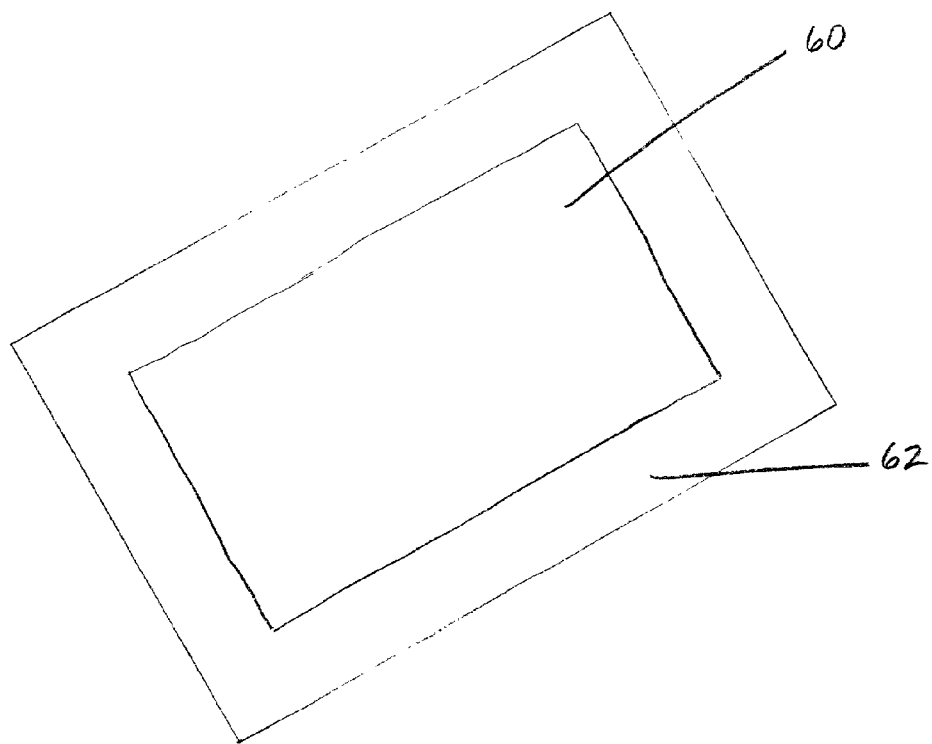
FIG. 5 comprises an isometric view of a processing substrate according to another embodiment of the present invention.

Referring now to FIG. 1A, a processing substrate and/or support surface that may be used as a food preparation surface or sheet 10 according to the present invention preferably is planar (i.e., flat) in shape. Alternatively, as seen in FIGS. 1B and 2, the sheet 10 may be tray-shaped and includes a substantially planar central portion or base 12 and inclined or curved side surfaces 14a–14d, wherein the base 12 and side surfaces 14 together define a generally concave structure. The side surfaces 14 may be formed by folding and/or scoring the sheet 10 at corner portions 15a–15d and optionally folding or scoring the sheet 10 at portions 13a–13d intermediate the base 12 and side surfaces 14. The inclined or curved side surfaces 14 could alternatively be formed by any other process, such as forming through the application of heat, vacuum forming, vacuum pressure forming, or the like. If desired, fewer than four inclined side surfaces 14 may be provided. For example, only the inclined side surfaces 14a–14c may be employed to provide a flat edge surface that may be oriented toward the user so that an inclined side surface does not interfere with the user's hands or arms. Preferably, although not necessarily, the sheet 10 is intended for one time use as a cutting surface or as a sheet supporting an article or as a barrier for isolating an article resting on a surface (for example, a plant on a shelf, an article of food on a counter or in a microwave, or the like), or as a food preparation and bacteria management sheet. Following the use the sheet 10 and any waste products and contaminants carried thereby may be disposed of in any suitable fashion. The concave or tray-shaped structure (if used) facilitates retention of the waste products and contaminants during the food preparation, transport and/or disposal processes. Additionally or alternatively, the sheet 10 may be sufficiently flexible to allow the user to bend and/or fold the sheet 10 to prevent escape of waste products and contaminants therefrom during disposal.

Referring also to FIG. 3, according to one embodiment of the present invention, the sheet 10 also includes a cut-resistant, liquid-permeable top or upper portion or layer 16, which substantially prevents the integrity of the sheet 10 as a whole (and, in particular, the layer 16) from being compromised during cutting while at the same time allowing passage of juices and liquids through the layer 16. Preferably, the upper portion or layer 16 is made of a material sufficiently durable to withstand aggressive cutting of meats, vegetables and other food items by a serrated or non-serrated blade, particularly in the situation where a cutting motion is applied to meats, poultry or fish (or any other fibrous protein material) that results in the application of cutting force components in multiple directions to the item. A serrated blade presents a series of equally or non equally spaced points or tips to the upper surface of the layer 16 that can snag or otherwise catch on edges of the material used for the top layer 16. Because of this it is generally preferred (although not necessarily the case) that the top layer 16 have irregularly or randomly spaced openings therein that prevent any points or tips from contacting material below the layer 16 during cutting. In this way, the possibility that the integrity of the sheet 10 would be compromised is reduced.

In addition to the foregoing, the upper portion or layer 16 preferably has an upper surface 17 that is textured or otherwise formed to prevent slippage of items thereon during processing.

The sheet 10 further includes a middle or intermediate portion or layer 18 that may be made of a liquid absorbent material that retains the juices and liquids passed by the upper layer 16, as well as a bottom portion or layer 20, which is preferably made of a slip-resistant, liquid and bacteria impervious material to prevent slipping of the sheet 10 and leakage of liquids and transfer of bacteria onto or from a work surface (such as a countertop, a cutting board, or the like) during use.

The upper layer 16 may be of a length and width substantially equal to the length and width of the middle layer 18. Alternatively, the upper layer may be of a smaller size than the size of the layer 18, thereby providing a cutting surface that is partially or fully surrounded by portions of the middle layer 18. As a further alternative, the top and bottom layers 16, 20 may be of the same size and the middle layer may be of a smaller size and so arranged relative to the layers 16 and 20 such that the middle layer 18 is surrounded by the joined outer margins of the layers 16 and 20.

If desired, the sheet 10 may instead include a different number of layers or portions each imparting one or more desired characteristic(s) to the sheet 10. In addition, the sheet 10 may comprise a single layer or portion or multiple layers or portions wherein each layer or portion is made of material that is differentially treated during production to obtain multiple desired characteristics. Still further, the sheet 10 may include one or more layers or portions that are not differentially treated during production in combination with one or more layers that are differentially treated during production. For example, the sheet 10 could comprise a single layer that is liquid absorbent, but which has a first surface that is treated (by any suitable process, such as the application of heat or a chemical additive) during production to produce a cut-resistant, liquid-permeable surface. The sheet 10 may further have a second surface opposite the first surface that may be treated by any suitable process (for example, as noted above) during production to produce a slip-resistant barrier surface. Alternatively, the sheet 10 could comprise two layers, a first of which provides a slip-resistant barrier surface, and a second of which provides a cut-resistant surface. In this case, the liquid absorbent layer may be omitted, or the liquid-absorbent material may be provided as part of one of the first or second layers or as a separate layer. Still further, the slip-resistant surface and/or the cut-resistant, liquid-permeable surface could be omitted, if desired.

The various layers 16, 18 and 20 are secured or formed together in any suitable fashion taking the various materials of the layers into account. For example, two or more of the layers 16, 18 and 20 may be heated to fuse the layers together or the layers may be laminated as part of an extrusion process. Two or more of the layers could instead be secured together by an adhesive including a hot melt adhesive as well as a solvent or water based adhesive, as long as the adhesive is approved for food contact and compatible with the layers. Alternatively, two or more of the layers 16, 18 and 20 may be formed using materials and/or a manufacturing process which result in simultaneous formation and bonding of such layers. Still further, the layer 16 may be bonded or otherwise secured to the layer 20 at selected locations, thereby capturing the layer 18 therebetween. In this case, the layer 18 may have one or more voids therein to facilitate the joinder of the layers 16 and 20 at the location(s) of the void(s). Still further, the layer 18 may be omitted and the layers 16 and 20 may be joined at spaced locations to create voids between the layers 16, 20 which serve to attract and retain liquid(s) therein by capillary action.

FIG. 4 illustrates apparatus that may be used to produce a number of cutting surfaces as shown in FIG. 1A. An extrusion die or other delivery device 40 deposits thin streams of molten thermoplastic onto a web 42 of liquid-absorbent material, such as cellulosic tissue or batting. The material deposited on the web 42 is chosen from but not limited to polyolefins, such as polyethylene (PE), polyolefin metallocenes, metallocene polypropylene (mPP) or polypropylene (PP) including homopolymers and copolymers thereof, polyester, such as polyethylene terephthalate (PET), polystyrene (PS), polyvinyl alcohol (PVA), polyvinyl chloride (PVC), nylon (such as nylon 6 or nylon 66), polyacrylonitrile (PAN), ABS, ethylene-vinyl acetate (EVA) copolymer, multi layers of the same or different polymers, blends and recycled polymers (including polymers that are cured by ultraviolet or visible light, an electron beam, water or other curing agent). Addition of one or more filler(s) may be advantageous both from a cost advantage as well as improvement of modulus, heat distortion and cut resistance. Preferably, each stream is approximately on the order of 1–100 thousandths inch wide and are deposited at equally-spaced locations on the web 42 approximately 1–500 thousandths inch apart. Alternatively, the streams may be deposited at non equally spaced locations on the web 42 and/or may be of differing widths and/or may be deposited at different points of time. Still further, different stream shapes (e.g., a wavy, curved, discontinuous or interrupted stream as opposed to the linear continuous stream extent described above and/or a different cross-sectional shape) and/or different materials could be sequentially deposited on the web 42. In other words, a single stream may comprise a first portion of a first material, a second portion deposited after the first portion of a second material, a third portion deposited after the second portion of a third material or the first material, etc. In an alternative embodiment, adjacent streams may be of differing materials. In a general sense, N different materials may be deposited or otherwise formed in situ on the web 42 in a repeating or non-repeating sequence or pattern or in a random fashion. In the case of a repeating sequence or pattern, the repetition frequency may be established at a value less than or equal to N. In any event, the choice of materials, sequence or pattern, and the like affect the physical characteristics of the resulting surface.

If the upper layer 16 is to be smaller than the size of the layer 18, then the streams are deposited only on a center portion of the web 42. In addition, the flow of thermoplastic resin is periodically interrupted so that discrete portions of web are formed having thermoplastic thereon wherein such portions are separated by further web portions not having thermoplastic deposited thereon. The web 42 then passes between a pair of rolls 44a, 44b. Preferably, the roll 44a is smooth and the roll 44b has a plurality of diamond-shaped or other shaped protrusions 46 on the surface thereof. The protrusions 46 deform and spread out the still molten thermoplastic streams to transform the linear streams into a desired two or three dimensional pattern of thermoplastic resin on the web 42. The web 42 then passes between one or more additional pairs of rolls 48 that further spread out and/or flatten the thermoplastic streams and impart a desired texture thereto. The resulting surface provides cut resistance and prevents food from sliding thereon If desired, any pattern can be created on the web 42, for example, a random pattern or a crisscross pattern could be created by drizzling, spraying or otherwise applying the material thereto.

Thereafter, the web 42 is inverted (i.e., turned over) and the layer 20 is formed in situ by lamination or other delivery of a thermoplastic or other material onto an undersurface 50 by an extrusion die or other delivery apparatus. The layer 20 may alternatively be formed without first inverting the web 42 by any suitable process. The layer 20 may be formed of any of the materials described above in connection with the layer 16 including polyolefins such as PE or PP, polyesters such as PET, PS, PVA, PVC, nylon, PAN, ABS, EVA, etc . . . In alternative embodiments, 20 a suitable coating material may be applied by a sprayer and mechanically processed by a doctor blade or a portion of the material of the layer 18 may be melted or otherwise differentially processed as noted above so that a sealed portion is obtained (if the material of the layer 18 so permits). Still further, a barrier layer of Tyvek® (sold by E. I. Du Pont de Nemours and Company of Wilmington, Del.) may alternatively be secured to the underside of the web 42 by any suitable means.

The layer 20 may be formed with a pattern or texture by embossing and/or may be coated or laminated or otherwise formed with a slip-controlling (such as slip resistant) or adhesive material. The slip control may be provided by a continuous or discontinuous surface of the layer 20, as desired. The resulting coated web is then cut at appropriate locations to form the cutting sheets. Alternatively, if desired, the product may be delivered to the consumer in roll form so that the consumer may cut the product to a desired length and/or shape using a cutter bar, scissors or knife. Still further, the product may be delivered in roll form with perforations that allow the consumer to tear off sheets as needed.

The present invention is not limited to the concept of utilizing disposable, absorbent barrier surfaces in place of conventional cutting boards, but encompasses all food handling and article support occasions where absorbent, liquid/bacteria barrier management is desirable. The present invention comprehends arrangements of various barrier, absorbent and cut/physical abuse resistant mechanisms for the management by containment or isolation of wastes and bacteria encountered during food processing, such as cutting, draining and accumulating (staging). All of these processes involve the use of a generally horizontal work surface, where the present invention may be advantageously employed. In general, the invention comprehends the use of N layers or other portions which may be arranged in a suitable or desired fashion to obtain the desired mechanical, absorbent, barrier and/or other characteristics.

The preferred embodiment utilizes the cut resistant layer 16 as the top layer, where the cutting operation is performed. If desired, the layer 16 may be omitted and the cut-resistant surface could instead be provided as part of the bottom layer 20. In this case the cut-resistant surface would need to be impervious to liquid and the material of the middle layer 18 could be exposed directly to the item being cut. This alternative may result in the possibility of material transfer from the layer 18 to the food, although such possibility can be minimized through careful control of materials and design. For example, in an embodiment where the liquid absorbent layer 18 is the top layer, effort should be made to ensure minimum transfer of material (e.g., fibers) to the food being cut. In the case of paper, woven or nonwoven fabrics as the material of the liquid absorbent layer 18, thermal bonding of fiber to fiber in such layer and/or fiber of such layer to the material of the bottom layer 20 significantly reduces fiber transfer to the food. Many other commercially available techniques for minimizing transfer of material(s) exist. For example, various thermal embossing patterns could be used. Care should be taken to ensure that the absorptive capacity of the material of the layer 18 is minimally affected by the mode of bonding.

Other arrangements can be envisioned, such as thermoplastic/cellulosic conglomerates or agglomerates. In these arrangements thermoplastic and cellulosic absorptive materials are compressed together or otherwise processed and/or combined to form a cut resistant, absorptive sheet. When a thermoplastic liquid barrier component is fused on one side, a cut resistant, absorptive, barrier system is formed.

Still further, each layer or portion may be "tuned" (in other words, the material selection, properties and/or amounts may be controlled) to obtain the desired attributes and properties for each. For example, a first sheet could be designed for cutting chicken comprising an upper layer of PE or PP, a middle layer of cellulosic absorbent material and a barrier layer of polymeric material as described above in connection with FIG. 4. A second sheet could alternatively be envisioned for light food preparation (such as assembling sandwiches from pre-cut foods) including the same three layers in different proportions. This might comprise an upper layer of PE or PP having a thickness substantially less than the thickness of the upper layer of the first sheet, a middle layer of cellulosic absorbent material identical to the material of the middle layer of the first sheet and a barrier layer of polymeric material identical to the material of the barrier layer of the first sheet. The thicknesses of the middle and barrier layers of the second sheet may be different than or identical to the thicknesses of the same layers of the first sheet. This provides a sheet having lesser cut resistance than the first sheet, but still provides a sheet having the desired absorbency and barrier characteristics appropriate to the intended application for the sheet. Still further, the cellulosic material of the middle layer might be replaced by a more oleophilic material, such as nonwoven polypropylene or the same or a different cellulosic material that has been treated to increase the oleophilic properties thereof, to form a sheet for managing oil during food preparation.

The present invention provides a processing and/or support surface that retains liquids yet is convenient and space effective for easy disposal. The product may be pre-treated for packaging purposes and/or to allow easy and convenient disposal. Examples of pretreatment for easy disposal include pleating, folding, scoring, forming and the like.

As noted above, the cut resistant top layer 16 may be made from a random or regular pattern of thermally formable material or coating materials. In addition to the examples given above, the material of the layer 16 may comprise latexes, epoxies, paper coating and a contact drum print that is treated by a doctor blade. Still further, a continuous sheet of polymer film could alternatively be used in place of the cut-resistant upper layer described in conjunction with FIG. 4 wherein the film is perforated by any suitable process, such as vacuum, needle or water jet perforating, laser, hot pins or mechanical punching to create holes for the passage of liquid therethrough. A minimum hole diameter of between about 0.060 and about 0.125 thousandths inch is preferred. Less than 8 holes/square inch (depending upon hole size(s)) is preferred. The spacing between the tips of serrated knife blades vary; however, the smaller the hole diameter the less the chance that a tip of such a blade will catch on an edge of a hole. The film can be made of virgin polymer or blends of virgin and recycled materials or from recycled materials alone. As noted above, fillers or pigments to increase opacity, optimize desired properties, and/or reduce cost are options. Alternatively, porosity can be achieved using different processes such as pre- or post-lamination, lost mass process, leaching or scavenging.

The cut resistant layer 16 can alternatively comprise other cut resistant structures, such as netting, fabrics or scrims, so long as the layer allows easy passage of juices and other liquids through to the absorbent layer 18. In each embodiment the minimum thickness for the layer 16 is approximately 5 mils for unfilled materials, but it may be possible to achieve adequate cut resistance with thinner arrangements.

Care should be taken to use food contact approved materials. The use of a discontinuous layer affords a cut resistant barrier that keeps the material of the layer 18 from the surface of the item being cut. Also, the discontinuous layer lends itself to being easily disposed of due to ease of "wadding" by the user The liquid-absorbent layer 18 preferably is an absorbent structure selected from, but not limited to: non-woven fabrics of synthetic polymers or blends of fibers; laminates of various fabrics or combination of fabrics; cellulosic material(s), meltblown and spunbonded nonwoven fabrics, woven fabrics, multiple layers and combinations of fabrics and papers, adsorbent powders like polyacrylic acid polymers, open-celled foams, perforated closed cell foams and/or blends of polymer and cellulosic materials. The layer 18 could alternatively comprise any other suitably absorbent commercially available materials.

If a synthetic polymer fabric, woven or nonwoven, is used for the layer 18, a food-contact approved wetting agent or other surface additive may be required to ensure water wettability of the fabric. Typical levels are <1% by weight of the fabric. Some hydrophilic fibers can be used for layer 18 in blends with synthetic polymers to eliminate the need for surfactants. Examples of these hydrophilic fibers are cellulose, rayon and PVA; however, the present invention is not limited to these hydrophilic fibers. In some cases lamination of two different fabrics may be necessary to obtain sufficient hydrophilic properties. However, it is preferred in this example to use a blend of fibers in one fabric. Typically, a minimum of 5 to 10% hydrophilic fiber is needed in a fiber blend to ensure that the fabric has sufficient hydrophilic properties. An additional benefit of using fiber blends in the layer 18 is the possibility to use different polymers in the layer 16 and still employ thermal bonding of the layers.

The bottom layer 20 forms a barrier to prevent liquids from the absorbent layer from passing through to the surface of the counter top or other support surface. The bottom layer 20 also blocks the transfer of bacteria between the layers 16 and 18 and the surface supporting the sheet 10. The bottom layer 20 can be any substrate material that prevents passage of liquid therethrough. For example, the layer 20 may comprise a continuous sheet of PP or PE film (or any other polymer film, such as those noted above) having a thickness on the order of 0.25–5.0 mils, although a different thickness could be used instead. Fillers and/or coloring agents or other additives can be utilized to obtain the desired characteristics, color and/or opacity. Like the layer 16, the film can be made of virgin polymer or blends of virgin and recycled materials or from recycled materials alone. Typically, the layer 20 is fabricated of materials chosen from a group of materials that will thermally bond to the layer adjacent thereto (in the preferred embodiment the layer 18), thereby obviating the need for adhesives, which are costly and can adversely affect the desired characteristic (e.g., the absorbent nature) of the adjacent layer.

In summary, the present invention comprehends any structure (single layer or multilayer, conglomerates, agglomerates, foams, product suspended in one or more matrices or suspensions) having cut resistant properties, liquid-absorbent properties and/or barrier properties. The properties may be afforded by any suitable processing technique(s), such as coating or other application of product, denaturing or other change in a material (whether by flame treating or other application of heat, chemicals, irradiation, UV, IR or visible light, etc . . . ), mechanical or electrical processing, or the like. In addition, the various materials may be selected from ecologically advantageous materials that biodegrade.

In the case of foams, these can be either of the open-cell or closed cell type made from conventional polyolefins or polyolefin filled materials. Still further, a foam can be filled with combinations of any of the non-conventional materials listed below, such as egg whites and shells or other foams could be used with fillers like mica, starch, wood flour, calcium carbonate and flax. Other suitable materials may be bread impregnated with adhesive binders, foamed potato starch or polyvinyl acetate with any number of fillers like ground bone, lime or talc. Other suitable foams are polyvinylpyrollidone aggregate open cell foams and PE and PP aggregate foams. Such combined materials can provide cut resistance and/or liquid absorption properties.

Hollow fibers could also be employed. In this case, hollow fibers of a critical diameter may be used to suck up and retain water by capillary action. These fibers could possess cut resistant properties as well as liquid management properties and a barrier layer could be secured by any suitable means to a mat of such fibers to obtain a processing surface according to the present invention.

The following materials possess one or more of the above absorptive properties, cut resistance properties and barrier properties effective to manage bacteria or liquids during the preparation of food. Accordingly, any of these materials can be used in the present invention. Some are very eco-effective in that they decompose directly to food for biocycles and many do not absorb microwave energy and are safe for use as a support surface in microwave ovens:

"Earth shell" (a composition of potato starch and lime manufactured and/or sold by E. Khashoggi Industries, LLC of Santa Barbara, Calif.);

clay or clay-filled materials optionally reinforced with materials such as ground corncobs, silica, irradiated waste sludge or woven straw;

kelp and other marine vegetation;

ground marine shells (e.g., lobster, crab, shrimp or any other exoskeletal creatures, oyster, clam, scallop or zebra mussel shells) held together by a binder or matrix of any suitable material, such as barnacle adhesive;

cork;

wood or wood product derivatives and veneers; natural fibers like cotton or wool either woven or in non woven batts;

materials such as flour, silica, rice, rice kernel, rice germ or starch of any kind (e.g., corn or potato starch) either alone or held together by a binder such as polyvinyl acetate or held together as conglomerate or agglomerate systems by any appropriate material(s);

animal, insect and/or fish products including shells, skins, hides, hooves, glues made from hides or hooves, scales or bones; other protein glues or glues from other products (such as gluten);

egg white or egg yolk composites with flour, rice, egg shells, flours with yeast, corn starch or potato starch;

lecithin;

polymeric substances created from high temperature treatment, or other breakdown, of carbon chains predominantly in sugars and oils, such as is found in apples, grapes, cherries or other fruit (skins and/or pulp) olives (skins and/or pulp), olive oil, corn oil, vegetable oil, canola oil, or eggs;

bioengineered cell growth materials;

grasses and other terrestrial vegetation;

bark;

nonwoven microfibers;

cellular absorption swellable materials (such as Drytech® sold by The Dow Chemical Company of Midland, Mich.);

molecular sieve materials (e.g., a desiccant); and hydrophilic powders, like polyacrylic acid or the like.

Another embodiment of this invention can be seen in FIGS. 5–9. As seen in FIGS. 5–9, a bilayer single use processing substrate comprises a first two-ply cut-resistant layer 60 and a second two-ply layer 62. The first layer has a first surface area 64 and comprises a tissue ply 66 disposed below a thermoplastic material ply 68. The tissue ply 66 has a thickness in the range of between about 2 and about 6 mils and the thermoplastic material ply 68 has a thickness in the range of between about 4 and about 8 mils. The second layer 62 has a second surface area 70 and comprises a tissue ply 72 disposed above a thermoplastic material ply 74. The tissue ply 72 has a thickness in the range of between about 2 and about 6 mils and the thermoplastic material ply 74 has a thickness in the range of between about 1 and about 5 mils. The first layer 60 is disposed atop the second layer 62 such that the first layer tissue ply 66 and the second layer tissue ply 72 are secured to each other by such means as an adhesive or a water soluble polyethylene oxide coating on first and second layer tissue plies 66, 72, and wherein a portion of the second surface area 70 is laterally disposed outside of the first surface area 64.

The adhesive (not shown) can be applied either to the entire surface of the first layer 60 or can be applied in any number of patterns, including without limitation interrupted patterns such as a series of spaced spots and continuous patterns such as parallel stripes or interlocking stripes. One preferred pattern is a series of parallel stripes. It has been found that this pattern adds a capillary effect to the processing substrate by slightly separating the sheets. This separation creates a capillary effect that helps draw liquids away from the surface of the cut resistant layer 60. Also, these parallel stripes channel the liquid toward that portion of layer 62 that is not covered by layer 60 in the preferred embodiment.

Each of the first and second layers 60, 62 can be produced by extrusion coating the thermoplastic material ply onto the tissue ply in a manner similar to the process illustrated in FIG. 4. While the thermoplastic material plies can be formed from any of the thermoplastic materials described above, a preferred material is an isotactic copolymer metallocene polypropylene, wherein the metallocene polypropylene comprises between about 95 and about 99.95, and preferably between about 99.5 and about 99.9 percent by weight of a propylene monomer and between about 0.05 and about 5, and preferably between about 0.1 and about 0.5 percent by weight of an ethylene monomer.

The surface of each thermoplastic material ply can range from smooth to rough. While the two surfaces can both have similar surface characteristics, in one preferred embodiment, the top surface of the cut resistant layer 60 can be smooth and the bottom surface of the second two ply layers can be rough or have a matte appearance. The method of creating these surface effects is well known to those skilled in the art of film production. One method of producing these effects is to use a film casting roll that mirrors the desired roughness of the film. For smooth films the roll can have a root mean square of about 0.5 to about 10 and for the matte surface the roll can have a root mean square of over about 100.

The most preferred resin composition comprises between about 90 and about 100 by weight of the metallocene polypropylene and can further include any combination of the following components: an additive selected from the group of talc, mica, wollastonite, calcium carbonate, barite, glass spheres and fibers, carbon fibers, and ceramic spheres, present in an amount of between about 0 and about 10 percent by weight, a food contact grade alkali metal stearate such as calcium stearate, magnesium stearate and the like or a food contact grade transition metal stearate such as zinc stearate and the like present in an amount of between about 0.01 and about 0.1 by weight, and one or more antioxidants, such as Alvinox P, Irgaphos 168, Alkanox 240, Iraganox 3114, Iraganox 1010, Anox IC 14, and Alvinox FB, present in an amount of between about 0 and about 0.25 by weight. Small amounts of other additives (nucleation agents, clarifiers and pigments) or processing aids can also be included so long as they do not negatively affect the overall performance properties of the material. Preferably, additives must be approved for direct food contact. It is believed that the talc additive speeds crystalline formation in the polypropylene and improves the cut resistant properties of the polymer, whereas a transition metal stearate serves as a film lubricant for the polypropylene during processing.

The first layer tissue ply 66 and the second layer tissue ply 72 are provided by an outside paper provider such as Little Rapids Corporation. Each of the first and second layer tissue plies 66, 72 comprise a virgin hardwood and softwood wood pulp present in an amount of between about 90 and about 100 percent by weight of the tissue, a polyamide or other synthetic fiber present in an amount of between about 0 and about 10 percent by weight of the tissue ply and can include one or more of the following components in trace amounts: a defoamer, a dryer release agent, one or more creping agents, a repulping aid and a bleach neutralizer. The components present in trace amounts are additives which are used as machine runnability aids for the tissue.

The first layer 60 has a surface area 64 less than the surface area 70 of the second layer 62 and is preferably substantially centered on the second layer 62. In a preferred embodiment, the first and second layers 60, 62 have dimensions such that the surface area 64 of the first layer 60 is greater than 50 percent and less than 100 percent of the size of the surface area 70 of the second layer 62. An arrangement of layers can be used wherein first layer 60 is coextensive with the second layer 62 in a first dimension but is smaller than the second layer 62 in the second dimension. Across the second dimension, the first layer 60 can be centered or offset relative to the second layer 62. When the first layer 60 is centered, this forms areas or gutters of similar sizes. Where the first layer 60 is offset relative to the second layer 62 in a second dimension, either a single area or gutter is formed along one edge or two different sized areas or gutters can be formed. The visibility of that portion of tissue ply 72 of second layer 62 which is not covered by first layer 60 provides positive reinforcement to the ultimate user of the processing sheet of the present invention that the sheet has absorbent as well as protective characteristics.

Figure 6:
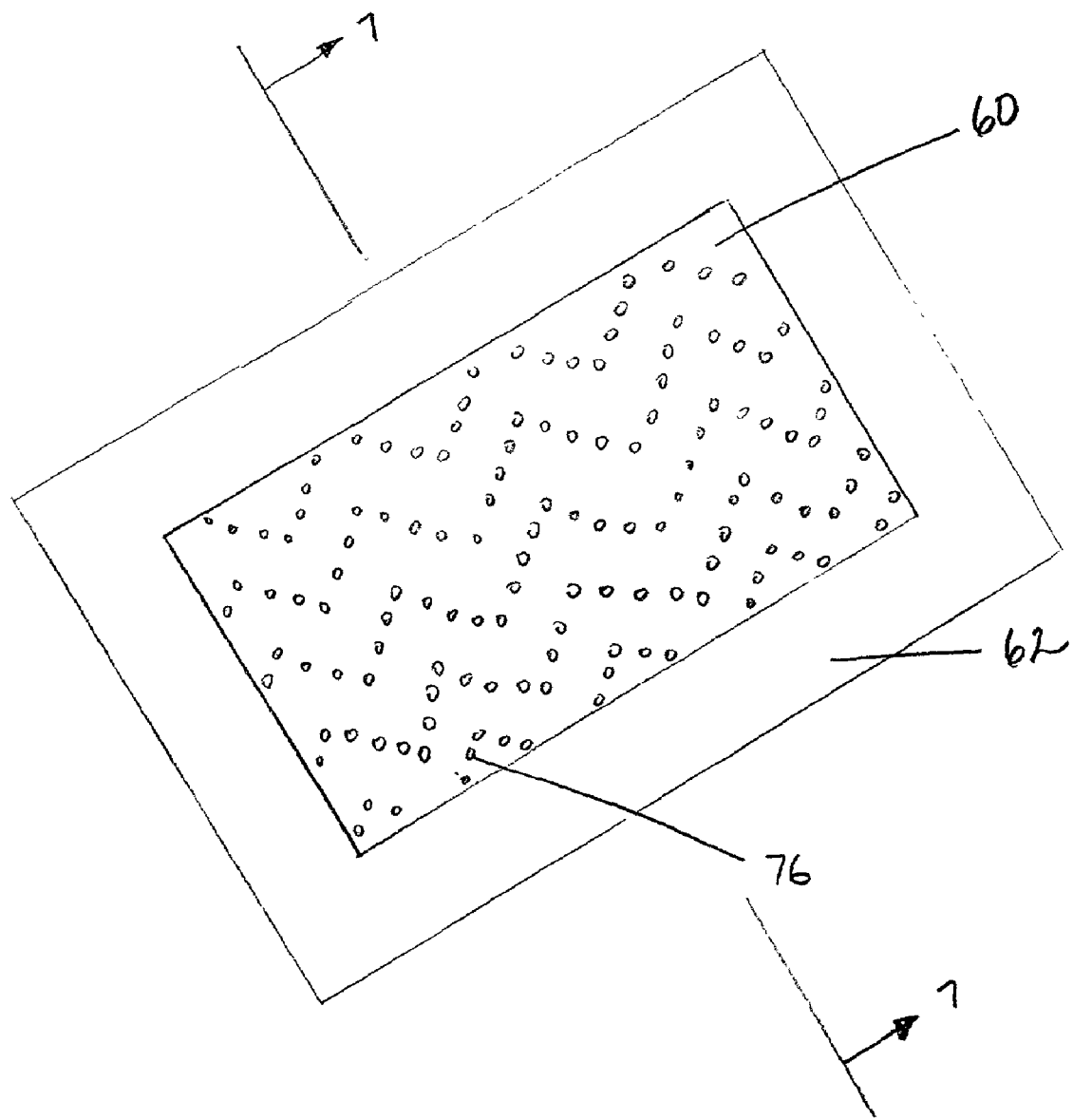
FIG. 6 comprises an isometric view of a processing substrate according to another embodiment of the present invention.
Figure 7:
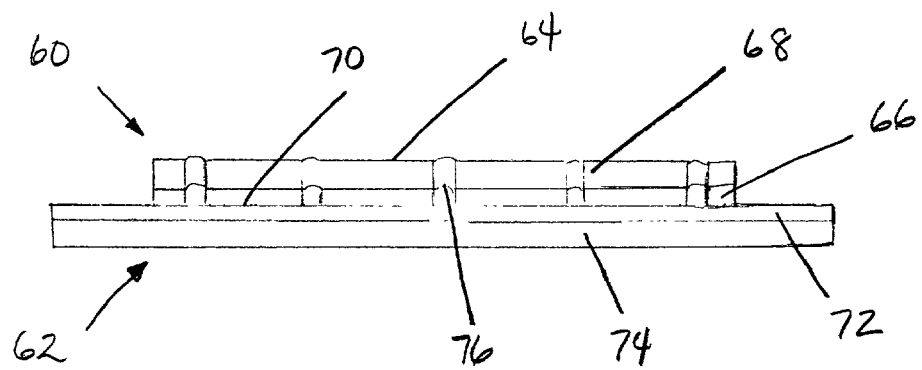
FIG. 7 comprises a cross sectional view of FIG. 6.

In a commercial embodiment, the substrate may include the first layer 60 having dimensions of between about 6 inches and about 12 inches by between about 5 inches and about 10 inches and the second layer 62 may include dimensions of between about 10 inches and about 16 inches by between about 8 inches and about 13 inches. As seen in FIGS. 6 and 7, the first layer 60 may have regularly spaced apertures 76 therein to permit flow of fluids therethrough. While a preferred arrangement of apertures is a zigzag pattern in the first layer 60, wherein the apertures 76 are separated from one another by between about 0.25 inches and about 0.375 inches in the x-direction and between about 0.125 inches and about 0.75 inches in the y-direction, any arrangement and density of these apertures can be used. As shown in FIG. 7, apertures 76 do not extend into or through the second layer 62. The apertures 76 are formed by any suitable process, such as vacuum, needle or water jet perforation, laser, hot pins or mechanical punching, wherein the apertures have a substantially circular geometry and a nominal diameter of between about 0.060 inches and about 0.125 inches. According to the dimensions of the first layer and the number of apertures therein, the average number of apertures per square inch is between about 0 and about 8. An alternative aperture geometry can be regularly shaped rectangular or square apertures.

Figure 8:
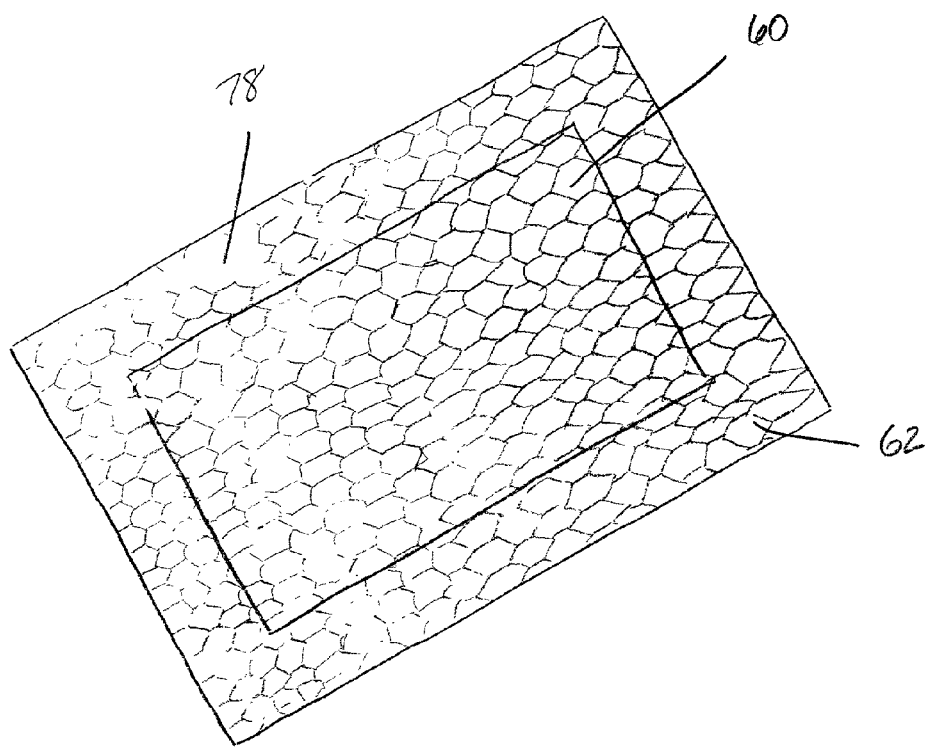
FIG. 8 comprises an isometric view of a processing substrate according to another embodiment of the present invention.
Figure 9:
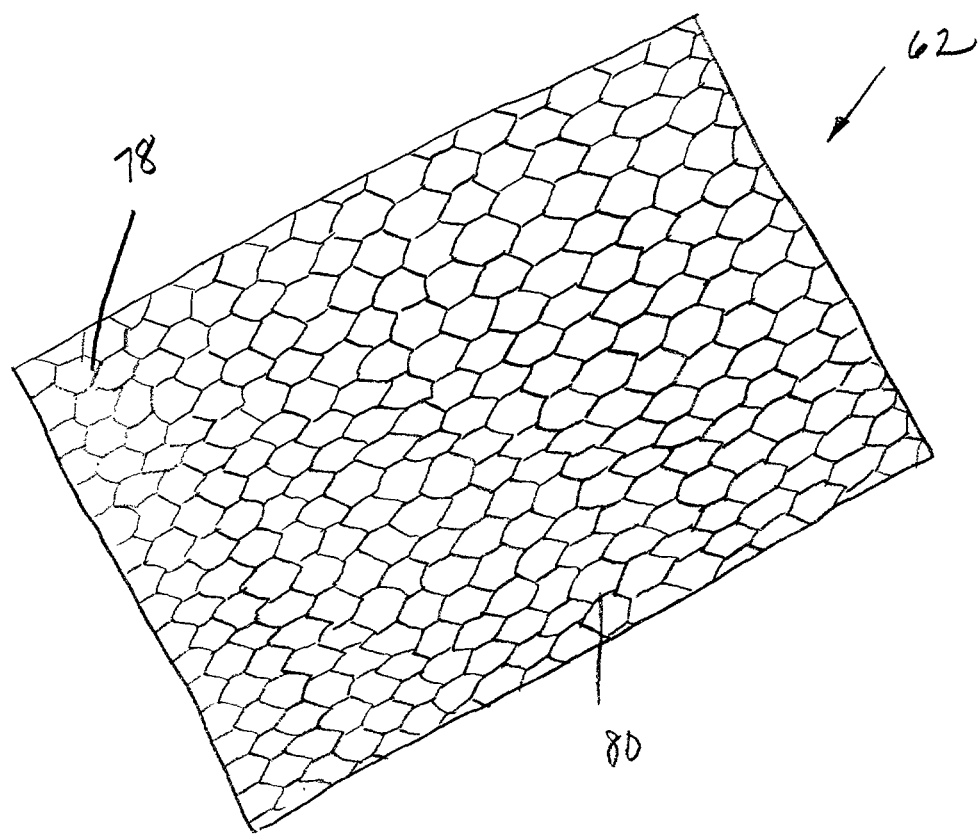
FIG. 9 comprises an isometric rear view of a processing substrate according to FIG. 8.

As seen in FIGS. 7 and 8, the first surface area 64 and the portion of the second surface area 70 disposed outside of the first surface area 64 may be formed with a pattern or texture 78 by embossing, wherein the step of embossing occurs after the substrate is assembled. This pattern or texture of embossing can be seen on a back surface 80 of the second layer 62 as seen in FIG. 9.

Further specific examples of structures according to the present invention are given below:

Example 1—a trilayer structure wherein the layer 16 comprises 5 mil thick PP, filled with up to 40% mica and including 1/32" diameter holes with 9 holes/square inch. The layer 18 is a 37# airlaid cellulose mat thermally laminated to a 5 mil thick PP backing sheet comprising layer 20. The layer 16 is thermally bonded to the layer 18.

Example 2—a bilayer structure comprising a nonwoven polyolefin fabric upper layer point bonded to a second layer of polymeric film that functions both as a barrier and as a cut resistant surface. During manufacture a food-contact approved surfactant may be applied to the upper layer to provide a desired hydrophilic characteristic.

Example 3—a scrim made of any of a variety of materials, such as a thermoplastic or thermosetting polymeric material having voids between portions of material is post-filled with absorbent material, such as cellulose, using any suitable post-filling process, such as a wet-laid process or a vacuum process, to form a mat. A barrier layer of any suitable material (e.g., PP or PE) is thereafter applied in any suitable manner, such as by extrusion lamination, to an undersurface of the mat and the mat is thereafter subjected to an embossing process either while the barrier layer is still partially molten and/or as heat is applied to cause the barrier layer to bond securely to the scrim.

Example 4—a bilayer single use processing substrate comprises a first layer 60, wherein the tissue ply 66 is 2.5 mils thick and the thermoplastic material ply 68 is 5 mils thick. The second layer 62 has a tissue ply 72 which is 2.5 mils thick and a thermoplastic material ply 74 which is 3.5 mils thick, wherein the first layer 60 is secured atop the second layer 62 by an ethyl vinyl acetate adhesive.

Each of the thermoplastic material plies consists of a resin comprising an isotactic copolymer metallocene polypropylene, wherein the metallocene polypropylene comprises 99.9 percent by weight of a propylene monomer and 0.1 percent by weight of an ethylene monomer. The resin comprises 93.873 percent by weight of the metallocene polypropylene, 6.050 percent by weight of a talc additive, 0.055 percent by weight of calcium stearate, 0.011 percent by weight of a primary antioxidant, and 0.011 percent by weight of a secondary antioxidant.

The first and second layer tissue plies 66, 72 comprise 98 percent by weight of a virgin hardwood and softwood wood pulp, 0.2 percent by weight of a polyamide wet strength resin and trace amounts of a defoamer, a dryer release agent, two creping agents, a repulping aid and a bleach neutralizer.

The first layer 60 has dimensions of 9.75 inches by 7.688 inches and the second layer 62 has dimensions of 11.75 inches by 9.688 inches. The first layer 60 includes 414 regularly spaced apertures created by having a nominal diameter of 0.08 inches, wherein the apertures form a zigzag pattern and are separated from one another by 0.279 inches in the x-direction and 0.165 in the y-direction. The average number of apertures per square inch is 5.52.

The first surface area 64 and the portion of the second surface area 70 disposed outside of the first surface area are embossed with embossing pattern 78.

The present invention can provide one or more of the following benefits, depending upon the choice of material(s), properties and material amounts:

1. the sheet absorbs food juices while cutting and reduces resulting mess;
2. the sheet is easy to dispose of;
3. the sheet reduces or even prevents accidental germ/microbial contamination because the germs from one food item will not get transferred to another if the cutting sheet is disposed of after use;
4. the sheet provides cut resistance, i.e., it helps reduce any cut damage to the kitchen or other work surface;
5. the sheet does not allow food juices to run all over the work surface;
6. the sheets may be provided in varying sizes to suit the cutting or other task;
7. the sheet may be used on top of a cutting board or directly on the work surface;
8. the sheet reduces slippage, by providing a skid-resistant contact with the work surface;
9. after cutting, one need only lift the sides of the sheet to funnel food into a cooking pot;
10. the sheet can be set on a surface to catch debris and grease;
11. the sheet is easily rolled up with waste captured therein and disposed of in the trash can;
12. since each sheet is clean the need for repeated cleaning of the cutting board or other work surface is avoided;
13. the sheet can be used to cut or process any food or other material including meat, chicken, fish, soft or hard fruits and vegetables, dough, etc . . . ;
14. unlike using a paper towel, the sheet does not permit fiber and lint to become attached to the food being cut.;
15. the sheet does not transfer any smell or taste to the product being cut or otherwise processed (alternatively, the sheet could be impregnated with a desirable scent, such as lemon, which is then transferred to the item being processed);
16. the sheet manages bacteria by absorption, containment and barrier rather than by the use of added chemicals;
17. the sheet can be made food contact approved;
18. the top surface reduces slippage of food while cutting;

19. the cutting surface will not dull knives like some hard cutting surfaces;

20. the sheet is hygienic;

21. the sheet may be formed with at least one and, preferably multiple absorbent edges that give an extra measure of security to manage bacteria-borne juices;

22. the sheet offers superior food/surface protection for non-cutting food preparation applications;

23. the sheet affords an easy, convenient medium for in-home or out-of-home, recreational and outdoor uses;

24. the sheet can be cut by consumers to other sizes and/or shapes;

25. the sheet can be held in place on countertops by a few drops of water;

26. the sheet protects the countertop and food from potentially deadly pathogens that cannot be seen;

27. the sheet allows safer food preparation for the consumer and the consumer's family by reducing the risk of food-borne illness;

28. the sheet can reduce food preparation time;

29. the profile and/or texture of the cutting surface can be customized to provide benefits not practical in conventional cutting surfaces or boards simply because such articles would be difficult or impossible to wash;

30. the sheets do not take up room in the dishwasher or in the bags and wraps drawer of the kitchen;

31. in alternative embodiments bacteria borne liquids are securely trapped in cells and/or a layer below the cutting surface;

32. the sheet may be constructed so that the consumer can see the absorption of liquid;

33. the sheet may be made to have a clean hygienic appearance;

34. the sheet may have a decorative appearance that is printed and/or embossed as desired;

35. the sheet absorbs like a paper towel, but has the additional advantages of barrier and cut resistance;

36. the sheet has additional uses, for example, as a placemat, as counter protection for use around stove/cook top, bin/shelf protection in refrigerator, under dog or cat dish, under plants, under large serving dishes, etc . . . ;

37. in some embodiments the sheet has a place to wipe a knife on;

38. the sheet can make a desirable addition to a picnic basket;

39. the sheet can be used to line a refrigerator meat tray;

40. the sheet absorbs and contains all juices from defrosting meat;

41. the sheet can contain odors from foods, such as fish;

42. the sheet can be used on dishes and platters to prevent scratching of same by knives;

43. the sheet can be placed under sticky and dripping containers in refrigerator;

44. the sheet does not fall apart like paper towels; and 45. the sheet could be used as a drawer liner or as a mat to do art projects on.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

INDUSTRIAL APPLICABILITY

The present invention is not limited to the concept of utilizing disposable, absorbent barrier surfaces in place of and/or in conjunction with conventional cutting boards, but encompasses all food handling, article support and barrier/isolation applications where absorbent, liquid/bacteria barrier management is desirable.

We claim:

1. A disposable cutting sheet for cutting and preparation of food items thereon, comprising;

a first cut-resistant layer having a first surface area and including a cellulosic ply and a thermoplastic material ply, wherein the thermoplastic material ply of the first layer includes a plurality of apertures therethrough; and a second layer having a second surface area and including a cellulosic ply and a thermoplastic material ply, wherein the cellulosic ply of the first layer is disposed on and secured to the cellulosic ply of the second layer such that portions of the thermoplastic and cellulosic plies of the second layer extend beyond the first surface area of the first layer to form a border completely surrounding the first layer.

2. The disposable cutting sheet of claim 1, wherein the first layer cellulosic ply is disposed below the first layer thermoplastic material ply.

3. The disposable cutting sheet of claim 2, wherein the first layer thermoplastic material ply is extrusion coated onto the first layer cellulosic ply.

4. The disposable cutting sheet of claim 1, wherein the second layer cellulosic ply is disposed above the second layer thermoplastic material ply.

5. The disposable cutting sheet of claim 4, wherein the second layer thermoplastic material ply is extrusion coated onto the second layer cellulosic ply.

6. The disposable cutting sheet of claim 1, wherein the thickness of the first layer cellulosic ply is between about 2 to about 6 mils.

7. The disposable cutting sheet of claim 1, wherein the thickness of the second layer cellulosic ply is between about 2 to about 6 mils.

8. The disposable cutting sheet of claim 1, wherein the thickness of the first layer thermoplastic ply is about 5 mils.

9. The disposable cutting sheet of claim 1, wherein the thickness of the second layer thermoplastic ply is about 3.5 mils.

10. The disposable cutting sheet of claim 1, wherein the first layer thermoplastic ply and the first layer cellulosic ply include a plurality of apertures therein.

11. The disposable cutting sheet of claim 10, wherein the apertures are created by perforating.

12. The disposable cutting sheet of claim 10, wherein the apertures are created by punching.

13. The disposable cutting sheet of claim 10, wherein the first layer thermoplastic ply and the first layer cellulosic ply contain an average of 5.52 apertures per square inch.

14. The disposable cutting sheet of claim 10, wherein the apertures are substantially circular.

15. The disposable cutting sheet of claim 14, wherein the apertures have a diameter of about 0.08 inches.

16. The disposable cutting sheet of claim 10, wherein the apertures are regularly spaced.

17. The disposable cutting sheet of claim 16, wherein a spacing between apertures is created in the x-direction by 0.279 inches and in the y-direction by 0.165 inches.

18. The disposable cutting sheet of claim 17, wherein the spacing between apertures creates a zigzag pattern in the first layer thermoplastic ply and the first layer cellulosic ply.

19. The disposable cutting sheet of claim 1, wherein the first layer thermoplastic ply and the second layer thermoplastic ply includes a resin comprising metallocene polypropylene.

20. The disposable cutting sheet of claim 19, wherein the metallocene polypropylene comprises a copolymer of propylene and ethylene.

21. The disposable cutting sheet of claim 20, wherein the resin further includes a talc additive.

22. The disposable cutting sheet of claim 21, wherein the talc additive is present in an amount less than about 10 percent by weight of the resin.

23. The disposable cutting sheet of claim 22, wherein the resin further includes calcium, magnesium or zinc stearate.

24. The disposable cutting sheet of claim 23, wherein the resin further includes at least one antioxidant.

25. The disposable cutting sheet of claim 1, wherein the first layer is substantially centered in the second surface area in at least one direction.

26. The disposable cutting sheet of claim 1, wherein the first layer is substantially centered in the second surface area in both directions.

27. The disposable cutting sheet of claim 1, wherein the cutting sheet is embossed.

28. The disposable cutting sheet of claim 1, wherein the first layer has dimensions of about 9.75 inches by about 7.688 inches.

29. The disposable cutting sheet of claim 1, wherein the second layer has dimensions of about 11.75 inches by about 9.688 inches.

30. The disposable cutting sheet of claim 1, wherein the first layer is secured to the second layer by adhesive.

31. The disposable cutting sheet of claim 30, wherein the adhesive is ethyl vinyl acetate.

32. The disposable cutting sheet of claim 30, wherein the adhesive is in a pattern of parallel stripes.

33. The disposable cutting sheet of claim 1, wherein the thickness of the second layer thermoplastic ply is about 1 mil.

34. The disposable cutting sheet of claim 1, wherein the first layer has dimensions of about 9.75 inches by about 14 inches.

35. The disposable cutting sheet of claim 1, wherein the second layer has dimensions of about 11.75 inches by about 16 inches.

36. A disposable cutting sheet for cutting and preparation of food items thereon, comprising;
a first cut-resistant layer having a first surface area and including a ply of tissue disposed below a ply of thermoplastic material, wherein the first layer includes a plurality of apertures therethrough; and
a planar second layer having a second surface area and including a ply of tissue disposed above a ply of thermoplastic material, wherein the tissue ply of the first layer is disposed on and secured to the tissue ply of the second layer and substantially centered on the second layer in at least one dimension such that portions of the thermoplastic and tissue plies of the second layer extend beyond the first surface area of the first layer to form a border completely surrounding the first layer.

37. The disposable cutting sheet of claim 36, wherein the first layer thermoplastic material ply is extrusion coated onto the first layer tissue ply.

38. The disposable cutting sheet of claim 36, wherein the second layer tissue ply is disposed above the second layer thermoplastic material ply.

39. The disposable cutting sheet of claim 38, wherein the second layer thermoplastic material ply is extrusion coated onto the second layer tissue ply.

40. The disposable cutting sheet of claim 36, wherein the thickness of the first layer tissue ply is between about 2 to about 6 mils.

41. The disposable cutting sheet of claim 36, wherein the thickness of the second layer tissue ply is between about 2 to about 6 mils.

42. The disposable cutting sheet of claim 36, wherein the thickness of the first layer thermoplastic ply is about 5 mils.

43. The disposable cutting sheet of claim 36, wherein the thickness of the second layer thermoplastic ply is about 3.5 mils.

44. The disposable cutting sheet of claim 36, wherein the apertures are created by perforating.

45. The disposable cutting sheet of claim 36, wherein the apertures are created by punching.

46. The disposable cutting sheet of claim 36, wherein the first layer thermoplastic ply and the first layer tissue ply contain an average of 5.52 apertures per square inch.

47. The disposable cutting sheet of claim 36, wherein the apertures are substantially circular.

48. The disposable cutting sheet of claim 47, wherein the apertures have a diameter of about 0.08 inches.

49. The disposable cutting sheet of claim 43, wherein the apertures are regularly spaced.

50. The disposable cutting sheet of claim 49, wherein a spacing between apertures is created in the x-direction by 0.279 inches and in the y-direction by 0.165 inches.

51. The disposable cutting sheet of claim 50, wherein the spacing between apertures creates a zigzag pattern in the first layer thermoplastic ply and the first layer tissue ply.

52. The disposable cutting sheet of claim 36, wherein the first layer thermoplastic ply and the second layer thermoplastic ply include a resin comprising metallocene polypropylene.

53. The disposable cutting sheet of claim 52, wherein the metallocene polypropylene comprises a copolymer of propylene and ethylene.

54. The disposable cutting sheet of claim 53, wherein the resin further includes a talc additive.

55. The disposable cutting sheet of claim 54, wherein the talc additive is present in an amount less than about 10 percent by weight of the resin.

56. The disposable cutting sheet of claim 55, wherein the resin further includes calcium, magnesium or zinc stearate.

57. The disposable cutting sheet of claim 56, wherein the resin further includes at least one antioxidant.

58. The disposable cutting sheet of claim 36, wherein the first layer is substantially centered in the second surface area in both dimensions.

59. The disposable cutting sheet of claim 36, wherein the first surface area and the portion of the second surface area laterally disposed outside of the first surface area are embossed.

60. The disposable cutting sheet of claim 36, wherein the first layer has dimensions of about 9.75 inches by about 7.688 inches.

61. The disposable cutting sheet of claim 36, wherein the second layer has dimensions of about 11.75 inches by about 9.688 inches.

62. The disposable cutting sheet of claim 36, wherein the first layer is secured to the second layer by adhesive.

63. The disposable cutting sheet of claim 62, wherein the adhesive is ethyl vinyl acetate.

64. The disposable cutting sheet of claim 62, wherein the adhesive is in a pattern of parallel stripes.

65. The disposable cutting sheet of claim 30, wherein the adhesive is applied in interrupted patterns.

66. The disposable cutting sheet of claim 65, wherein the adhesive is applied as a series of spaced spots.

67. The disposable cutting sheet of claim 30, wherein the adhesive is applied in a continuous pattern.

68. The disposable cutting sheet of claim 62, wherein the adhesive is applied in interrupted patterns.

69. The disposable cutting sheet of claim 68, wherein the adhesive is applied as a series of spaced spots.

70. The disposable cutting sheet of claim 62, wherein the adhesive is applied in a continuous pattern.

71. The disposable cutting sheet of claim 36, wherein the thickness of the second layer thermoplastic ply is about 1 mil.

72. The disposable cutting sheet of claim 36, wherein the first layer has dimensions of about 9.75 inches by about 14 inches.

73. The disposable cutting sheet of claim 36, wherein the second layer has dimensions of about 11.75 inches by about 16 inches.

* * * * *